Aug. 6, 1935.   J. R. MacCALLUM ET AL   2,010,639
GUARD FOR CUTTER BARS OF MOWING MACHINES AND THE LIKE
Original Filed Dec. 8, 1932
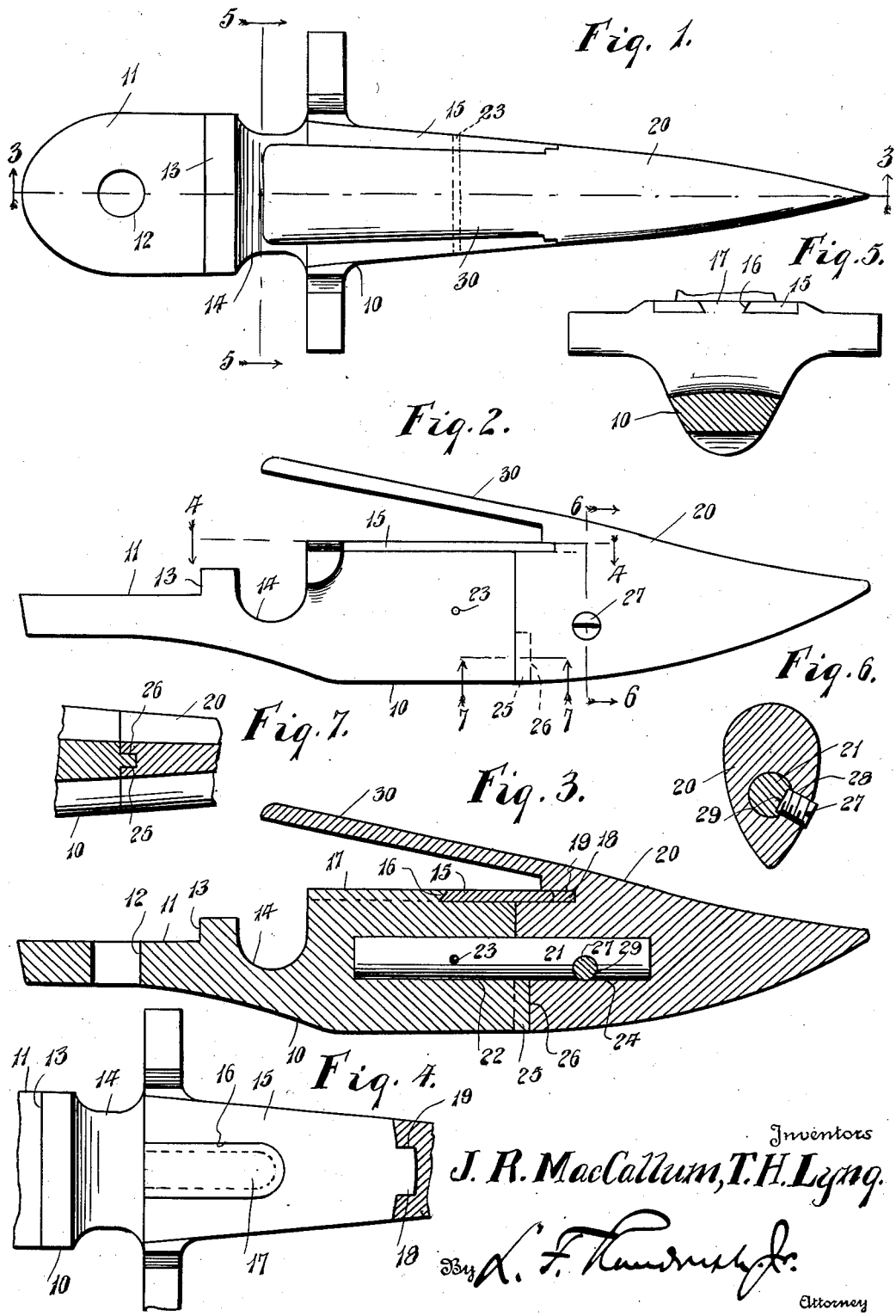

Patented Aug. 6, 1935

2,010,639

UNITED STATES PATENT OFFICE 2,010,639

GUARD FOR CUTTER BARS OF MOWING MACHINES AND THE LIKE

James R. MacCallum, Sunnyside, and Toris H. Lyng, Grandview, Wash.

Application December 8, 1932, Serial No. 646,328
Renewed December 15, 1934

3 Claims. (Cl. 56—309)

The invention relates to guards for mowing machines and the like, and has for its principal object the provision of means whereby the fender point of the guard may be replaced when worn or broken without removing the guard from the cutter bar, and also whereby a ledger plate mounted on the guard, and cooperating with the cutter blades on the cutter bar may be removed and replaced expeditiously when required.

A further object of the invention is the provision of an improved guard having a body portion that is secured to the cutter bar carriage and having a projecting pin on which the tapered fender point is removably secured, said point being removable for replacement thereof or for replacement of the ledger plate mounted on the guard when necessary.

The invention will be described in detail hereinafter and will be found illustrated in the accompanying drawing, in which Figure 1 is a top plan view of the improved guard, Figure 2, a side view in elevation, Figure 3, a longitudinal vertical sectional view taken on a plane indicated by the line 3—3 of Figure 1, Figure 4 is a fragmentary horizontal sectional view on a plane indicated by the line 4—4 of Figure 2, and Figure 5 is a transverse sectional view on a plane indicated by the line 5—5 of Figure 1, Figure 6 is a transverse sectional view on a plane indicated by the line 6—6 of Figure 2, and Figure 7 is a fragmentary detail sectional view on a plane indicated by the line 7—7 of Figure 2.

In the drawing similar reference characters are used to designate corresponding parts in all of the views.

The improved guard has a body portion 10 provided with a flat rearward extension 11 having a hole 12 therein to receive a bolt or rivet to secure the guard to a carriage bar of the cutter, 13 designates the shoulder that engages the front edge of said bar when the guard is in position. Forwardly of the shoulder 13 is a recess 14 to receive the cutter bar (not shown). 15 designates a ledger plate that cooperates with the blades on the cutter bar, said ledger plate being of hard steel and is provided with a recess 16 having dovetailed walls as shown in Figures 3, 4 and 5 to receive a dovetail projection 17 on the body portion 10. The opposite end of the ledger plate 15 from the recess 16 is provided with a reduced extension 18 that engages in recess 19 in the tapered fender point 20.

The fender point 20 is removably mounted on the body member 10 by means of the extended end of a pin 21 secured in recess 22 of the body portion 10 by means of a pin 23 engaging in alined openings in body portion 10 and pin 21, the fender point 20 being provided with a recess 24 to receive the extended end of the pin 21 as shown in Figure 3. 25 indicates a rib on the front side of the body member 10 that engages in a groove 26 in the fender point 20 when it is in position as shown in the drawing to hold said fender point in proper relation with the body member. 27 designates a set screw engaging in the threaded opening 28 in the fender point 20 and in a recess 29 in the pin 21, and holding the fender point 20 in position on the body member.

The fender point 20 is provided with an upwardly and rearwardly extending tongue 30 that extends rearwardly over the ledger plate 15 and partly over the recess 14. This rearward extension has the advantage of preventing trash from getting into the cutting blades secured to the cutter bar (not shown) and interfering with the operation of the cutting mechanism, it being clear that because of the construction of the guard with dismemberable portions and the elimination of the usual means of holding the ledger plates in the guard by riveting, now the usual practice, the fender tongue 30 is extended at a greater distance rearwardly over the forward edge of the cutter bar to protect the blades on the bar from contacting with the trash that would otherwise interfere with the operation of the cutter bar.

In the use of the improved guard it will be apparent that the body member 10 may be preferably secured to a cutter carriage and that repairs to the guard which usually involve the fender point or the ledger plate may be quickly made by removing and replacing the fender point for removal and replacement of the ledger plate, or renewal of the fender point when broken or worn. Furthermore, as the body member 10 and the fender point are usually made of cast metal the pin 21 that is secured in the body member and engages in the fender point, being made of steel, provides a reinforcement for the body member and the fender point.

What is claimed is:—

1. A guard for mower cutter bars, comprising a body member adapted to be secured to a cutter bar, a ledger plate having a dovetailed recess in one end and a reduced extension on the opposite end thereof, a dovetailed projection on the body portion engaging in said recess, and a fender removably mounted on said body member and having a recess to receive the reduced extension on the ledger plate.

2. A guard for mower cutter bars, comprising a body member adapted to be secured to a cutter bar, a ledger plate seated on said body member having a dovetailed recess in one end and a reduced extension on the opposite end thereof, a dovetailed projection on the body portion engaging in said recess, a reinforcing pin secured in said body member and projecting therefrom, and a fender provided with a recess to receive the projecting end of the pin and a second recess to receive the reduced extension on the ledger plate, and means engaging said pin to hold the fender in position on the body member.

3. A guard for motor cutter bars as in claim 2, the body member provided with a rib adjacent to said pin, and the fender provided with a groove receiving said rib.

TORIS H. LYNG.
JAMES R. MacCALLUM.